(12) United States Patent
Khairallah et al.

(10) Patent No.: US 6,249,730 B1
(45) Date of Patent: Jun. 19, 2001

(54) VEHICLE OCCUPANT PROTECTION SYSTEM AND METHOD UTILIZING Z-AXIS CENTRAL SAFING

(75) Inventors: Farid Khairallah, Farmington Hills; Scott E. Kolassa, Canton; Russell J. Lynch, West Bloomfield; Keith R. Miciuda, Grosse Pointe Park; Jon Kelly Wallace, Redford, all of MI (US)

(73) Assignee: TRW, Inc., Lyndhurst, OH (US)

( * ) Notice: Subject to any disclaimer, the term of this patent is extended or adjusted under 35 U.S.C. 154(b) by 0 days.

(21) Appl. No.: 09/574,954

(22) Filed: May 19, 2000

(51) Int. Cl.[7] .................................................. B60R 21/32
(52) U.S. Cl. ............................. 701/45; 701/36; 340/436; 180/282; 180/268; 280/734; 280/728.1
(58) Field of Search ............................... 701/45; 280/735; 307/10.1; 180/268, 282; 340/436, 669

(56) References Cited

U.S. PATENT DOCUMENTS

| 4,836,024 | 6/1989 | Woehrl et al. .......................... 73/514 |
| 5,173,614 | 12/1992 | Woehrl et al. ....................... 307/10.1 |
| 5,449,198 | * 9/1995 | Jeenicke et al. ..................... 280/735 |
| 5,468,013 | 11/1995 | Gille ..................................... 280/729 |
| 5,587,906 | * 12/1996 | McIver et al. ................. 364/424.045 |
| 5,732,374 | * 3/1998 | Ohm ....................................... 701/45 |
| 5,746,444 | * 5/1998 | Foo et al. .............................. 280/735 |
| 5,758,899 | 6/1998 | Foo et al. ........................... 280/730.2 |
| 5,815,393 | 9/1998 | Chae ....................................... 701/46 |
| 5,890,084 | 3/1999 | Halasz et al. ........................... 701/45 |
| 5,900,807 | * 5/1999 | Moriyama et al. ................... 340/436 |
| 6,002,974 | * 12/1999 | Schiffmann ............................ 701/36 |

* cited by examiner

Primary Examiner—William A. Cuchlinski, Jr.
Assistant Examiner—Tuan C To
(74) Attorney, Agent, or Firm—Tarolli, Sundheim, Covell, Tummino & Szabo L.L.P.

(57) ABSTRACT

A vehicle occupant protection system (10) includes an actuatable device (e.g., 20) for protecting a vehicle occupant (12). An accelerometer (e.g., 50) and a crash determination portion (66) of a controller (56) derive a first metric indicative of a vehicle crash condition. A Z-axis accelerometer (54) and a safing portion (50) of the controller (38) derive a second metric indicative of a vehicle vertical acceleration characteristic. The controller (66) actuates the device (e.g., 16) to protect the occupant (12) in response to the first metric indicating a vehicle crash condition and the second metric exceeding a predetermined threshold. Preferably, the system (10) includes a second device (e.g., 18) and another accelerometer (e.g., 58) and another crash determination portion (72) of the controller (56) to derive a third metric indicative of a vehicle crash condition. The controller (66) actuates the device (e.g., 18) to protect the occupant (12) in response to the third metric indicating a vehicle crash condition and the second metric exceeding a predetermined threshold. Thus, the second metric is utilized twice.

17 Claims, 3 Drawing Sheets

VEHICLE OCCUPANT PROTECTION SYSTEM AND METHOD UTILIZING Z-AXIS CENTRAL SAFING

FIELD OF THE INVENTION

The present invention is directed to vehicle occupant protection systems that incorporate a safing function to control actuation of a protection device.

BACKGROUND OF THE INVENTION

Vehicle occupant protection systems that have at least one actuatable protection device are known in the art. An actuatable protection device of such a system is actuated upon the occurrence of a condition for which a vehicle occupant is to be protected. Two examples of conditions for which a vehicle occupant is to be protected are the occurrence of a vehicle frontal collision and the occurrence of a vehicle side collision.

One type of actuatable protection system includes an air bag module mounted within a vehicle such that an air bag of the module is inflatable within an occupant compartment of the vehicle. The air bag is inflated upon the occurrence of a condition, such as a vehicle frontal collision. Another type of actuatable protection system includes a side curtain module mounted within a vehicle such that an inflatable side curtain of the module is extendible between an occupant and side structure (e.g., door glass) of a vehicle. The side curtain is extended upon the occurrence of a condition, such as a vehicle side collision.

Typically, a protection system includes a controller that controls actuation of the one or more protection devices within the system. The control provided by the controller is in response to one or more signals provided from one or more crash sensors, or the processing of the one or more signals. For example, the protection system may include an accelerometer that outputs a signal indicative of vehicle crash acceleration. The controller determines whether the signal is indicative of crash acceleration above a predetermined threshold. When the threshold is exceeded, the controller actuates one or more protection devices.

Many known systems utilize sensory input from two sensors and/or the processing of the two sensory inputs in somewhat of a redundant fashion to make a final determination regarding actuation of a protection device. Both sensory inputs must indicate, or result in determinations, that a crash condition is present in order for actuation to occur. Typically, the redundant aspect is referred to as providing a "safing" function. Within a system that has a safing arrangement, one sensor/processing arrangement is referred to as primary and the other sensor/processing arrangement is referred to safing.

One example of a system that includes a safing function is a system that has an accelerometer responsive to a crash acceleration (e.g., deceleration along a longitudinal axis of a vehicle) and a simple mechanical switch that is responsive to crash acceleration in the same direction (e.g., longitudinal). The output of the accelerometer is processed to determine if a threshold value is exceeded. The mechanical switch merely closes in response to sufficient vehicle deceleration. Typically, the mechanical switch closes at a relatively low crash acceleration value compared to the threshold value utilized in conjunction with the accelerometer output. Accordingly, the switch closes at a very early stage of a vehicle crash. With the switch closed, when the crash acceleration as perceived by the accelerometer exceeds the predetermined threshold value, an occupant protection device is actuated.

As sophistication of occupant protection systems continue to increase, the number of protection system devices, the number of sensory inputs, and the amount of sensory data to process continues to increase.

SUMMARY OF THE INVENTION

In accordance with one aspect, the present invention provides a vehicle occupant protection system that includes an actuatable device for protecting a vehicle occupant. Means derives a first metric indicative of a vehicle crash condition. Means derives a second metric indicative of a vehicle vertical acceleration characteristic. Means actuates the device to protect the occupant in response to the first metric indicating a vehicle crash condition and the second metric exceeding a predetermined threshold.

In accordance with another aspect, the present invention provides a vehicle occupant protection system that includes protection means actuatable for protecting a vehicle occupant. Means determines a first vehicle crash condition utilizing a first metric indicative of a vehicle longitudinal acceleration characteristic. Means determines a second vehicle crash condition utilizing a second metric indicative of a vehicle lateral acceleration characteristic. Means derives a third metric indicative of a vehicle vertical acceleration characteristic. Means actuates the protection means in response to the determined occurrence of the first crash condition and the third metric exceeding a predetermined first threshold value. The means also actuates the protection means in response to the determined occurrence of the second crash condition and the third metric exceeding a predetermined second threshold value.

In accordance with another aspect, the present invention provides a method of protecting a vehicle occupant. A first metric indicative of a vehicle crash condition is derived. A second metric indicative of a vehicle vertical acceleration characteristic is derived. An actuatable device is actuated to protect a vehicle occupant in response to the first metric indicating a vehicle crash condition and the second metric exceeding a predetermined threshold.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF PREFERRED EMBODIMENT

Figure 1:
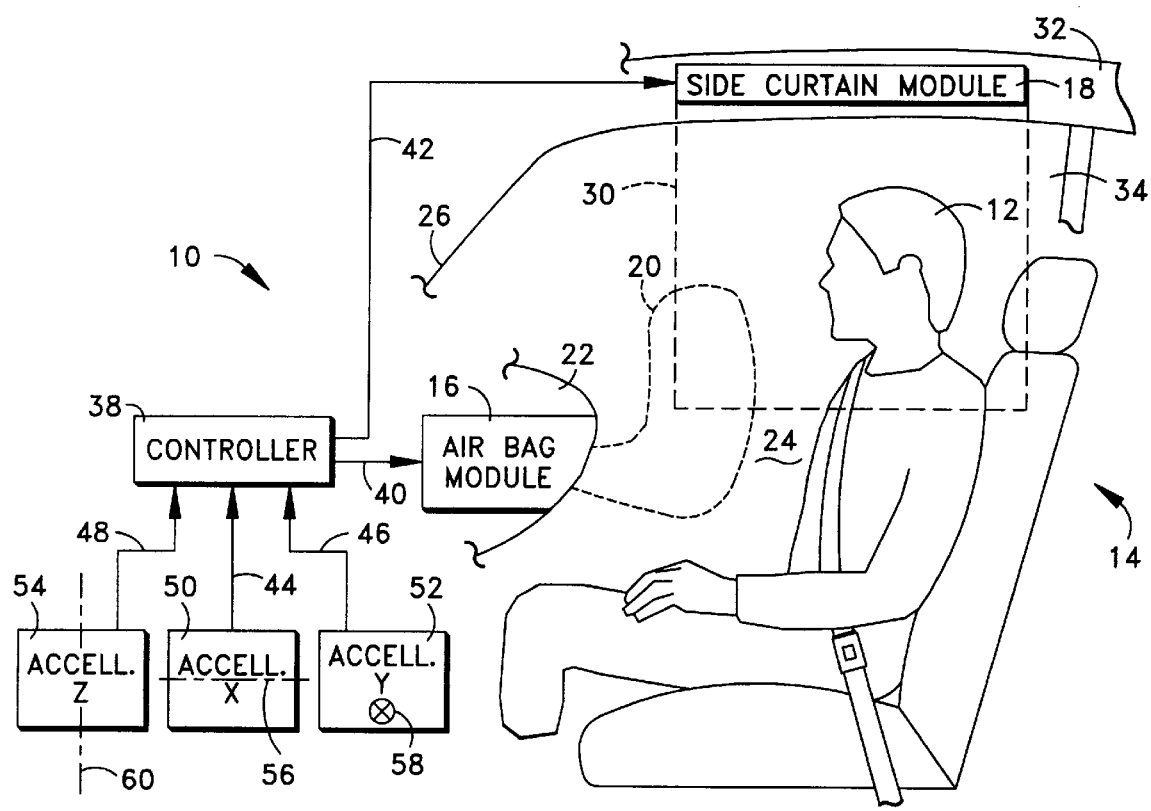
FIG. 1 is a schematic illustration of a vehicle having an occupant protection system in accordance with the present invention.

An occupant protection system 10, in accordance with the present invention, for an occupant 12 within a vehicle 14 is schematically illustrated in FIG. 1. The system 10 includes at least one actuatable occupant protection device (e.g., 16). In the illustrated example, two occupant protection devices 16 and 18 are provided. Collectively or separately, the occupant protection devices 16 and 18 may be considered protection means that is actuatable (i.e., actuation of either one or both devices) to protect the vehicle occupant 12.

For the purpose of illustration of the invention and not for the purpose of limitation, the specific example of the first protection device 16 is an air bag module. The module 16 includes an inflatable cushion restraint 20 that is commonly referred to as an air bag. The air bag 20 is stored in a folded condition within the module 16 in a manner well known in the art.

A source (not shown) of inflation fluid (e.g., nitrogen gas) is provided within the air bag module 16 to inflate the associated air bag 20. The source of inflation fluid is commonly referred to as an inflator, and includes a stored quantity of pressurized inflation fluid and/or an inflation fluid generating material. The inflator has an associated igniter (e.g., a pyrotechnic squib) that is electrically activated to initiate flow of the inflation fluid from the inflator. The air bag module 16 is located within a dashboard or instrument panel 22 of the vehicle 14. The flow of inflation fluid to the air bag 20 inflates the air bag within an occupant compartment 24 of the vehicle between the occupant 12 and the instrument panel 22 and other forward structure 26 (e.g., a windshield), as will be appreciated by a person of ordinary skill in the art.

For the purpose of illustration of the invention and not for the purpose of limitation, the specific example of the second protection device 18 is a side curtain module. The side curtain module 18 includes an inflatable cushion barrier/restraint 30 that is commonly referred to as a side curtain. The side curtain 30 is stored in a folded condition within the module 18 in a manner well known in the art. Similar to the air bag module 16, a source of inflation fluid (e.g., an inflator, not shown) is provided within the side curtain module 18 to inflate the associated side curtain 30. Also, similar to the air bag module 16, the inflator has an associated source of inflation fluid that is electrically activated to initiate fluid flow into the side curtain 30.

In the illustrated example, the side curtain module 18 is located within an area 32 of the vehicle 14 adjacent to an upper edge of a side door 34 (e.g., a side of a headliner area). Flow of inflation fluid to the side curtain 30 inflates the curtain within the occupant compartment 24 between the occupant 12 and the door 34 and other side structure (e.g., a side window glass of the door 34), as will be appreciated by a person of ordinary skill in the art.

It is to be understood that the system 10 may include other and/or different occupant protection devices, and that the devices may be located elsewhere within the vehicle 14. Examples of different/additional actuatable protection system devices include a knee bolster module, a seat belt lock, a seat belt pretensioner module, and a D-ring adjuster module.

Control of the air bag module 16 and the side curtain module 18 (e.g., the protection means) is by a controller 38, which provides respective actuation signals 40, 42 to the air bag module and the side curtain module. In one example the controller 38 includes discrete components for performing procedures, and in another example the controller includes a microcomputer that performs a plurality of algorithm procedures.

The controller 38 receives sensory input (e.g., 44–48) from several sources (e.g., 50–54) and, using the sensory input, makes determinations regarding air bag module control and side curtain module control. In the illustrated example, one sensory input 44 to the controller 38 is provided by a first accelerometer 50 that senses crash acceleration along a longitudinal axis 56 of the vehicle 14. For convenience of terminology, the longitudinal axis 56 of the vehicle 14 is referred to as the X-axis 56 and the first accelerometer 50 is referred to as the X-axis accelerometer 50. The controller 38 utilizes the signal output from the X-axis accelerometer 50 to make a determination as to whether the vehicle 14 is experiencing a crash condition along the X-axis (e.g., a frontal vehicle crash).

In one example, the controller 38 determines whether the vehicle crash acceleration along the X-axis 56 exceeds a threshold value and thereby indicates a crash condition of the vehicle 14. It is to be appreciated that either the input indicative of the sensed longitudinal vehicle crash acceleration, per se, or the processed input is a metric indicative of the vehicle crash condition. Also, the provision and/or processing is a derivation of such a metric. It is to be further appreciated that the system 10 may provide/use another metric that indicates a crash condition.

A second sensory input 46 to the controller 38 within the illustrated embodiment is provided by a second accelerometer 52 that senses a crash acceleration along a lateral axis 58 of the vehicle 14. For convenience of terminology, the lateral axis 58 of the vehicle 14 is referred to as the Y-axis 58 and the second accelerometer 52 is referred to as the Y-axis accelerometer 52. The controller 38 utilizes the signal output from the Y-axis accelerometer 52 to make a determination as to whether the vehicle 14 is experiencing a crash condition along the Y-axis 58 of the vehicle.

In one example, the controller 38 determines whether the vehicle crash acceleration along the Y-axis 58 exceeds a threshold value and thereby indicates a crash condition of the vehicle 14. It is to be appreciated that either the input indicative of the sensed lateral vehicle crash acceleration, per se, or the processed input is a metric indicative of the vehicle crash condition. Also, the provision and/or processing is a derivation of such a metric. It is to be further appreciated that the system 10 may provide/use another metric that indicates a crash condition.

Typically, the air bag module 16 is actuated to protect the occupant 12 when the vehicle experiences a crash condition along the X-axis 56. Similarly, the side curtain module 18 is actuated to protect the occupant 12 when the vehicle experiences a crash condition along the Y-axis 58. In one example, the air bag module 16 is actuated when the vehicle 14 experiences a front collision and the side curtain module is actuated when the vehicle experiences a side collision.

In order to provide a safing function for actuation of the air bag module 16 and the side curtain module 18, the system 10 includes a third acceleration sensor 54 for monitoring vertical acceleration and the controller 38 processes the input 48 indicative of vertical acceleration to determine whether any vehicle crash condition is occurring. Specifically, the third acceleration sensor 54 senses acceleration along the vehicle vertical axis 60 and the controller 38 makes a determination as to whether the vertical acceleration exceeds a threshold value and thereby indicates a crash condition of the vehicle 14. For convenience of terminology, the vertical axis 60 of the vehicle 14 is referred to as the Z-axis 60 and the third accelerometer 54 is referred to as the Z-axis accelerometer 54.

In the illustrated example, if both the longitudinal and vertical (i.e., X-axis 56 and Z-axis 60) acceleration of the vehicle indicate a crash condition, the air bag module 16 is actuated. Similarly, if both the lateral and vertical (i.e., Y-axis 58 and Z-axis 60) acceleration indicate a crash condition, the side curtain module 18 is actuated. Accordingly, the provision of a sensed vertical or Z-axis acceleration parameter/the processing of the Z-axis parameter to provide a metric that is compared to a threshold value provides at least one safing function. It is to be appreciated that the provision and/or processing is a derivation of such a metric. In the illustrated example, the Z-axis safing function is utilized for both longitudinal crash determinations and latitude crash determinations. In view of the fact that the Z-axis safing function is utilized for both longitudinal and latitude safing, it can be considered a central safing function.

It is to be appreciated that any parameter functionally related to vertical or Z-axis acceleration can be utilized as the metric within a determination process to indicate that a crash condition is occurring. Further, it is to be appreciated that the Z-axis safing determination can be utilized for any type and any number of crash determinations. As shown in the example embodiment, the Z-axis safing function is utilized for both the longitudinal and latitude crash determinations. However, it is to be appreciated that the Z-axis safing function can be utilized for only one of these determinations or another crash determination not described herein.

Figure 2:
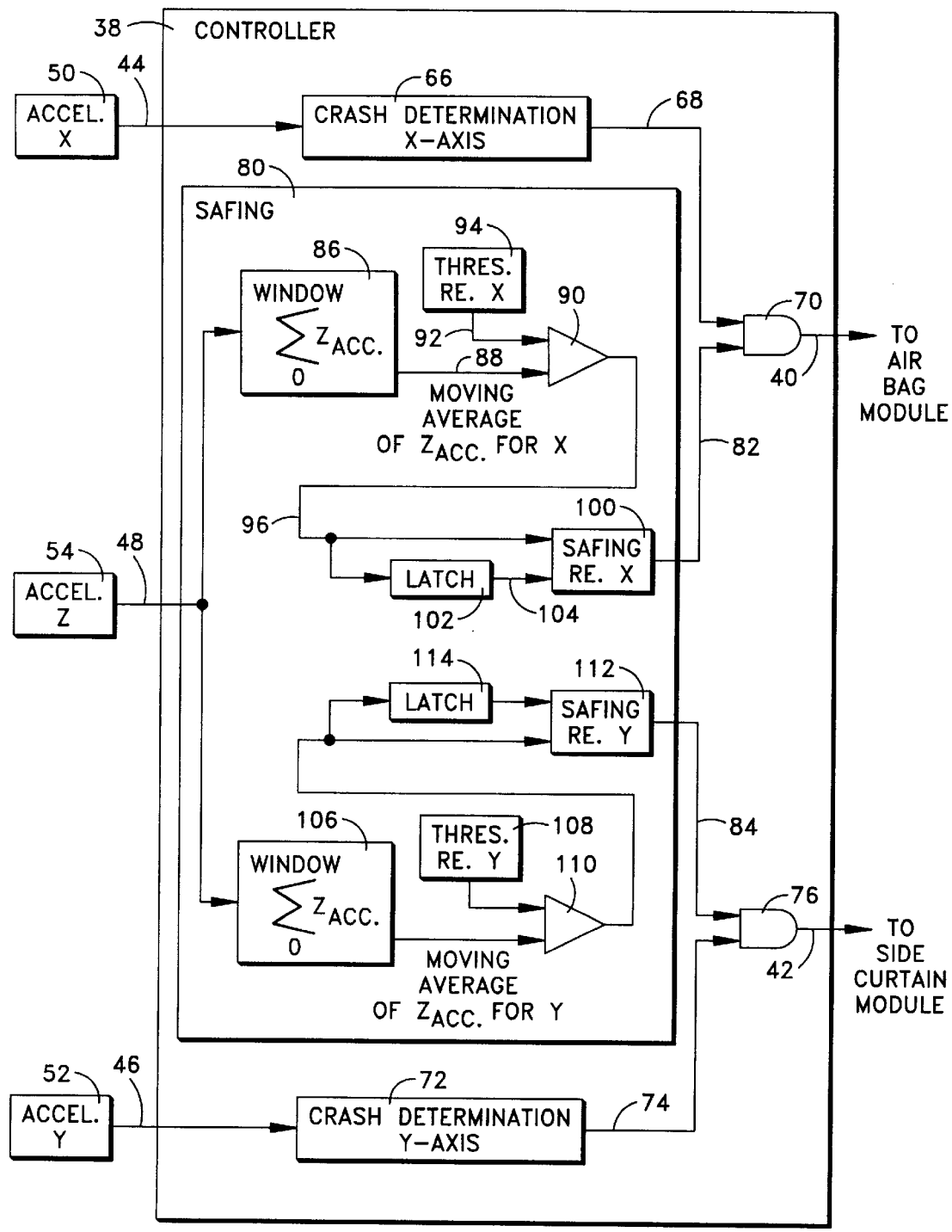
FIG. 2 is a schematic illustration of a portion of the system shown in FIG. 1.

Turning to an example construction of the system 10 that utilizes Z-axis safing for determinations for longitudinal (X-axis) and latitude (Y-axis) crash determinations, attention is directed to FIG. 2. Within FIG. 2, the controller 38 includes an X-axis crash determination function portion 66 that is operatively connected to receive the input 44 (i.e., acceleration signal) provided by the X-axis accelerometer 50. The X-axis crash determination function portion (hereinafter "the X-axis crash portion") 66 processes the signal indicative of longitudinal or X-axis acceleration.

The X-axis crash portion 66 is operatively connected 68 to one input of a first AND-gate 70. In response to a determination that a vehicle crash condition is occurring along the longitudinal axis of the vehicle, the X-axis crash portion 66 outputs a signal (e.g., a logic HIGH) to the first input of the AND-gate 70. It is to be noted that an output of the AND-gate is operatively connected to provide the actuation signal 40 to the air bag module 16.

A Y-axis crash determination function portion (hereinafter "the Y-axis crash portion") 72 of the controller 38 is operatively connected to receive the input 46 provided by the Y-axis accelerometer 52. Similar to the X-axis crash portion 66, the Y-axis crash portion 72 processes the signal indicative of Y-axis acceleration.

The Y-axis crash portion 72 is operatively connected 74 to one input of a second AND-gate 76. Upon a determination that the vehicle 14 is experiencing a crash condition along the Y-axis 58, the Y-axis crash portion 72 outputs a signal (e.g., a logic HIGH) to the first input of the second AND-gate 76. It is to be noted that an output of the second AND-gate 76 is operatively connected to provide the actuation signal 42 to the side curtain module 18.

The controller 38 includes a safing portion 80 that receives the input 48 provided by the Z-axis accelerometer 54. The safing portion 80 is operatively connected 82 to a second input to the first AND-gate 70 and is operatively connected 84 to a second input to the second AND-gate 76. Upon a determination that the vehicle 14 is experiencing a crash condition, the safing portion outputs appropriate signal(s) (e.g., a logic HIGH) to one or both of the AND-gates 70 and 76. It is to be understood that when the first AND-gate 70 receives suitable signals (e.g., logic HIGH) at both its inputs, the first AND-gate provides the actuation signal 40 to the air bag module 16. Similarly, when the second AND-gate 76 receives suitable signals (e.g., logic HIGH) at its inputs, the second AND-gate provides the actuation signal 42 to the side curtain module 18.

Turning to the specifics of the safing portion 80, the Z-axis acceleration signal is provided to a first metric component 86 that determines an acceleration-indicative value for the vertical (Z-axis) acceleration that is used for X-axis safing purposes. In the illustrating example, the acceleration-indicative value is a moving average value (A_MA) of the vertical acceleration. An average acceleration value is determined by summing successive Z-axis acceleration signal sample values during a time window. Window duration is predetermined and may be selected to provide a specific window desired for determinations regarding processing for the X-axis. The average value is successively determined for each signal sample, and is thus a moving average.

It is to be understood that the moving average (A_MA) is a metric of the Z-axis acceleration. Further, it is to be appreciated that the first metric component 86 may provide another metric that is functionally related to the Z-axis acceleration. For example, the Z-axis acceleration may be integrated within the first metric component 86.

A voltage value signal 88 indicative of the moving average (A_MA) of the Z-axis acceleration is provided by the first metric component 86 as a first input to a first comparator 90. A second input signal 92 to the first comparator 90 is a first predetermined threshold voltage value 94 provided via suitable circuitry. The first threshold voltage value 94 represents a predetermined value of moving-average acceleration.

A voltage value indicative of the moving average (A_MA) of the vertical acceleration that exceeds the first threshold voltage value 94 indicates that a vehicle crash event is occurring. Exceeding the predetermined value of moving-average acceleration is a "safing condition" that is thus satisfied. In the illustrated example, the first predetermined threshold voltage value is selected to relate to determinations regarding the X-axis crash events. Accordingly, a voltage value indicative of the moving average (A_MA) of the vertical acceleration that exceeds the first threshold voltage value 94 indicates that an X-axis vehicle crash event is occurring.

When the moving average of the Z-axis acceleration exceeds the first threshold, the first comparator 90 outputs a suitable signal 96 (e.g., a logic HIGH). The output signal 96 of the first comparator 90 is provided to a first safing component 98, which in turn outputs a suitable signal (e.g., a logic HIGH) indicative of the "safing condition" being satisfied. The output of the first safing component 100 is provided via the connection 82 to the second input of first AND-gate 70.

The output signal 96 of the first comparator 90 is also provided to a first latch component 102. The latch component 102 is operatively connected 104 to the first safing component 100 to latch the output signal of the first safing component for a predetermined time period once the first latch component receives the output signal 96 (e.g., logic HIGH) from the first comparator 90. Accordingly, the output signal of the first safing component 100 remains at the logic HIGH for a predetermined time period once the moving average of the Z-axis acceleration exceeds the predetermined threshold value. During the time that output of the first safing component 100 is latched HIGH, if the X-axis crash portion 66 determines that a crash condition is occurring along the X-axis of the vehicle the air bag module 16 is actuated.

Similar components are provided within the safing portion 80 of the controller 38 with regard to a safing determination utilized for Y-axis crash conditions. Specifically, the safing portion includes a second metric component 106 that determines a moving average of the Z-axis acceleration utilized for Y-axis determinations, a second predetermined threshold voltage value 108 regarding the Y-axis, a second comparator 110, a second safing component 112, and a second latch component 114. The output of the second safing component 112 is provided via the connection 84 to the second input second AND-gate 76. During the time that output of the second safing component 112 is latched HIGH, if the Y-axis crash portion 72 determines that a crash condition is occurring along the Y-axis of the vehicle the side curtain module 18 is actuated.

It is to be appreciated that although the components 106–114 provided for determinations concerning the Y-axis are similar to the components 86, 94, 90, 100 and 102 provided for determinations concerning the X-axis, differences between the two groups of components may be present. For example, within the second metric component 106 that provides the moving average, the window of summation may be different than the window utilized for the first metric component 86. The second threshold voltage value 108 utilized as a second input to the second comparator 110 may be different than the first threshold voltage value 94 (i.e., the threshold regarding the Y-axis may be different than the threshold regarding the X-axis). Also, the latch time provided by the second latch component 114 might be different than the latch time provided by the first latch component 102.

It is to be appreciated that although the safing portion 80 of the controller 38 in the shown example utilizes different components and possibly different values, parameters, etc. for the X-axis and Y-axis safing functions, the invention is not limited as such. For example, it is possible that only a single safing determination is made and that the output of the single determination is provided to both the first and second AND-gates 70 and 76. Specifically, it is possible that redundant structure (e.g., 106–112) is eliminated and the output of the first safing component 100 is provided to both the AND-gates 70 and 76.

Figure 3:
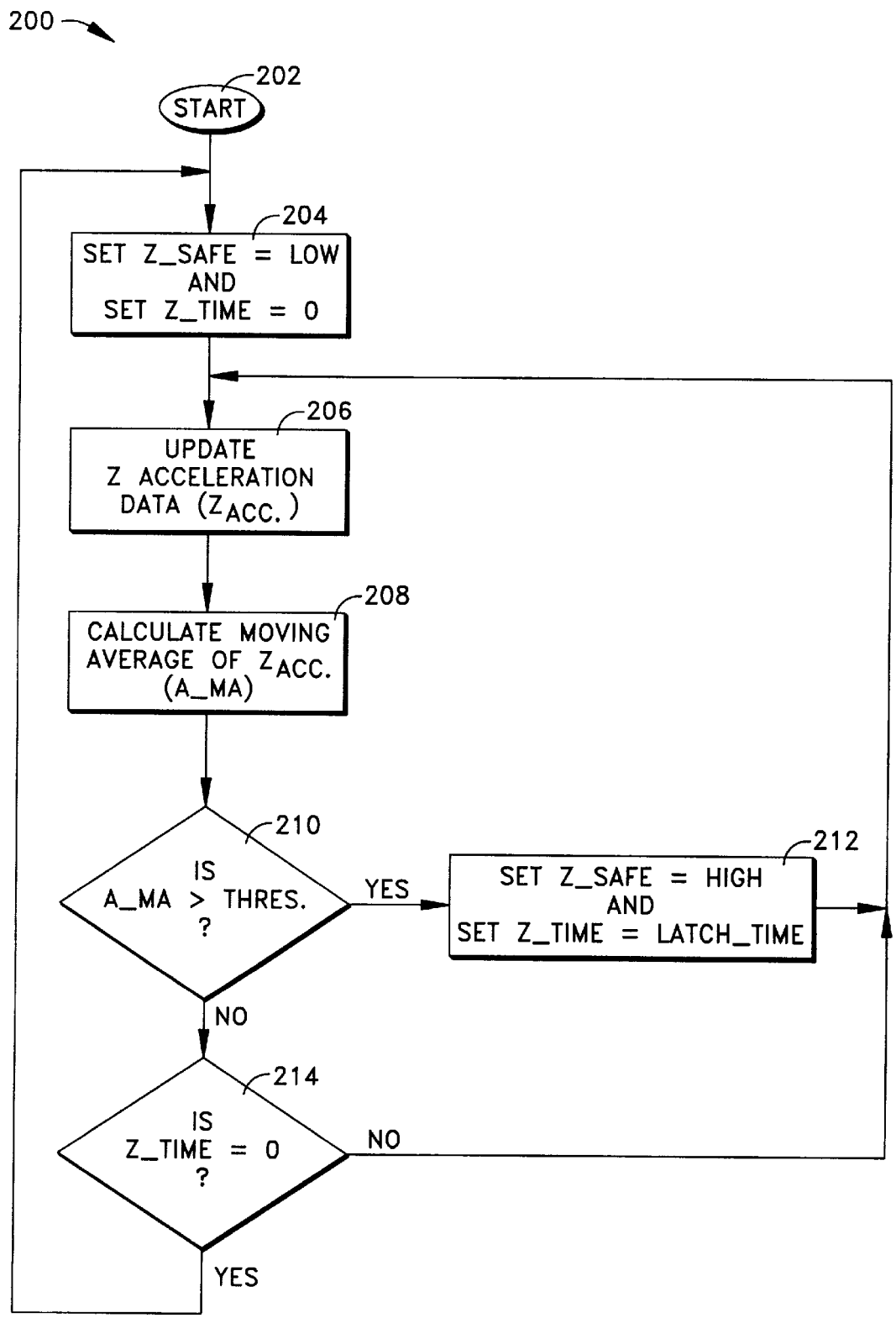
FIG. 3 is a flow chart representing a process performed in accordance with the present invention.

An example of a process 200 that embodies the present invention is shown in FIG. 3. A process 200 is initiated at step 202 and proceeds to step 204. At step 204, a variable Z_SAFE, which represents a safing determination output, is set equal to LOW. A low value of the variable Z_SAFE indicates that the process has determined that a vehicle crash condition is not occurring. In contrast, the variable Z_SAFE is set HIGH upon a determination that a vehicle crash condition is occurring.

Also, within step 204, a variable Z_TIME is set equal to zero. Z_TIME is a timer that can be set to a time period and then progressed toward zero. As an example, Z_SAFE is the output of the safing component 100 of the embodiment of FIG. 2, and Z_TIME is a timer within the latch component 102. Upon completion of step 204 (FIG. 3), the process 200 proceeds to step 206.

At step 206, Z-axis acceleration data is updated. At step 208, a moving average of Z-axis acceleration is calculated (e.g., moving average acceleration is A_MA). At step 210, it is determined whether the moving average of the Z-axis acceleration exceeds a predetermined threshold value (the threshold voltage value 94 within the example of FIG. 2). If the determination at step 210 (FIG. 3) is affirmative (i.e., the moving average of the Z-axis acceleration exceeds the predetermined threshold value), the process 200 proceeds from step 210 to step 212. Another way of viewing an affirmative determination at step 210 is that a determination has been made that a crash condition is likely occurring. At step 212, the variable Z_SAFE is set HIGH and the timer Z_TIME is set for a time duration LATCH_TIME. The consequence of step 212 is that a safing signal (i.e., Z_SAFE equals HIGH) is provided. Moreover, the provision of the safing signal will be provided for at least the time period LATCH_TIME.

Upon completion of step 212, the process 200 loops back to step 206. Steps 206, 208, and 210 are again repeated. Accordingly, updated acceleration information and an updated calculation of a moving average of Z-axis acceleration is again utilized to make a determination as to whether a crash condition is likely occurring.

If the determination at step 210 is again affirmative, the process 200 proceeds to loop through steps 212, 206, 208, and 210. However, if the determination at step 210 is negative (i.e., a moving average of the Z-axis acceleration is not greater than the predetermined threshold value), the process 200 goes from step 210 to step 214. Another way of viewing a negative determination at step 210 is that a crash condition may no longer be occurring. At step 214, it is determined whether the time Z_TIME has progressed toward zero.

If the determination at step 214 is negative (i.e., Z_TIME is not zero), the process 200 loops from step 214 to step 206. Such a situation will occur when the process 200 has previously had an affirmative determination at step 210 such that the timer Z_TIME was set to LATCH_TIME at step 212, and the moving average of the Z-axis acceleration has subsequently dropped to or below the threshold value (i.e., resulting in a negative determination at step 210), but because the timer Z_TIME has not yet progressed to zero, the determination at step 214 is negative.

It is to be noted that also within the step 212, the variable Z_SAFE was set HIGH. Accordingly, the variable Z_SAFE is latched HIGH while the timer Z_TIME decrements toward zero. If, within the time period prior to Z_TIME progressing to zero, the moving average of the Z-axis acceleration again exceeds the predetermined threshold value, then an affirmative determination at step 210 will result in a refreshing or resetting of the timer Z_TIME to LATCH_TIME.

However, if the moving average of the Z-axis acceleration remains equal to or less than the threshold value for the entire time period in which the timer Z_TIME decrements toward zero, the determination at step 214 is eventually affirmative. Upon an affirmative determination at step 214, the process 200 loops to step 204. At step 204, the variable Z_SAFE is again set equal to LOW. The process again proceeds to step 206, step 208, and step 210 to update, calculate, and make the determination regarding Z-axis acceleration.

From the above description of the invention, those skilled in the art will perceive improvements, changes and modifications. For example, one or more of the three accelerometers may be combined into a single unit, and acceleration values in the associated directions are derived (e.g., as vector components) from the output(s) of the single unit. Such improvements, changes and modifications within the skill of the art are intended to be covered by the appended claims.

Having described the invention, the following is claimed:

1. A vehicle occupant protection system comprising:
an actuatable device for protecting a vehicle occupant;
means for deriving a first metric indicative of a vehicle crash condition;
means for deriving a second metric indicative of a vehicle vertical acceleration characteristic; and
means for actuating said device to protect the occupant in response to said first metric indicating a vehicle crash condition and said second metric exceeding a predetermined threshold.

2. A system as set forth in claim 1, wherein said means for deriving a first metric includes means for deriving said first metric as indicative of a vehicle longitudinal acceleration characteristic.

3. A system as set forth in claim 2, wherein said actuatable device includes a frontal air bag module.

4. A system as set forth in claim 1, wherein said means for deriving a first metric includes means for deriving said first metric as indicative of a vehicle lateral acceleration characteristic.

5. A system as set forth in claim 4, wherein said actuatable device includes a side curtain module.

6. A vehicle occupant protection system comprising:

protection means actuatable for protecting a vehicle occupant;

means for determining a first vehicle crash condition utilizing a first metric indicative of a vehicle longitudinal acceleration characteristic;

means for determining a second vehicle crash condition utilizing a second metric indicative of a vehicle lateral acceleration characteristic;

means for deriving a third metric indicative of a vehicle vertical acceleration characteristic; and means for actuating said protection means in response to the determined occurrence of the first crash condition and said third metric exceeding a predetermined first threshold value, and for actuating said protection means in response to the determined occurrence of the second crash condition and said third metric exceeding a predetermined second threshold value.

7. A system as set forth in claim 6, wherein said protection means includes means for actuation in first and second different manners, said means for actuating said protection means in response to the determined occurrence of the first crash condition and said third metric exceeding a predetermined first threshold value includes means for actuating said protection means in said first manner, and said means for actuating said protection means in response to the determined occurrence of the second crash condition and said third metric exceeding a predetermined second threshold value includes means for actuating said protection means in said second manner.

8. A system as set forth in claim 7, wherein said protection means includes a frontal air bag module actuatable to provide said first manner of actuation of said protection means, and includes a side curtain module actuatable to provide said second manner of actuation of said protection means.

9. A system as set forth in claim 6, wherein said predetermined first threshold value is different than said predetermined second threshold value.

10. A method of protecting a vehicle occupant, said method comprising:

deriving a first metric indicative of a vehicle crash condition;

deriving a second metric indicative of a vehicle vertical acceleration characteristic; and actuating an actuatable device to protect a vehicle occupant in response to the first metric indicating a vehicle crash condition and the second metric exceeding a predetermined threshold.

11. A method as set forth in claim 10, wherein said step of deriving a first metric includes deriving the first metric as indicative of a vehicle longitudinal acceleration characteristic.

12. A method as set forth in claim 11, wherein said step of actuating an actuatable device includes actuating a frontal air bag module as the actuatable device.

13. A method as set forth in claim 10, wherein said step of deriving a first metric includes deriving the first metric as indicative of a vehicle lateral acceleration characteristic.

14. A method as set forth in claim 13, wherein said step of actuating an actuatable device includes actuating a side curtain module as the actuatable device.

15. A method as set forth in claim 10, wherein said step of deriving a first metric indicative of a vehicle crash condition includes determining the vehicle crash condition as a first vehicle crash condition utilizing the first metric as indicative of a vehicle longitudinal acceleration characteristic, said method includes determining a second vehicle crash condition utilizing a third metric indicative of a vehicle lateral acceleration characteristic, said step of actuating the actuatable device includes actuating a first actuatable device in response to the determined occurrence of the first crash condition and the third metric exceeding a predetermined first threshold value, and said method includes actuating a second actuatable device in response to the determined occurrence of the second crash condition and the third metric exceeding a predetermined second threshold value.

16. A method as set forth in claim 15, wherein said step of actuating the first actuatable device includes actuating a frontal air bag module as the first actuatable device, and said step of actuating the second actuatable device includes actuating a side curtain module as the second actuatable device actuatable.

17. A method as set forth in claim 15, wherein the predetermined first threshold value is different than the predetermined second threshold value.

\* \* \* \* \*